United States Patent
Bertrand et al.

(10) Patent No.: US 11,623,789 B2
(45) Date of Patent: Apr. 11, 2023

(54) AUTOMATIC SELF-SAMPLING BOTTLE FOR SPIRITS

(71) Applicant: Jacob A. Bertrand, Montgomery, OH (US)

(72) Inventors: Jacob A. Bertrand, Montgomery, OH (US); Richard J. Ponton, Fairfield, OH (US)

(*) Notice: Subject to any disclaimer, the term of this patent is extended or adjusted under 35 U.S.C. 154(b) by 0 days.

(21) Appl. No.: 17/100,233

(22) Filed: Nov. 20, 2020

(65) Prior Publication Data

US 2021/0147115 A1 May 20, 2021

Related U.S. Application Data

(60) Provisional application No. 62/937,860, filed on Nov. 20, 2019.

(51) Int. Cl.
| | |
|---|---|
| *B65D 23/04* | (2006.01) |
| *B65D 85/72* | (2006.01) |
| *B65D 1/02* | (2006.01) |
| *B65D 1/04* | (2006.01) |

(52) U.S. Cl.
CPC .......... *B65D 23/04* (2013.01); *B65D 1/0223* (2013.01); *B65D 1/04* (2013.01); *B65D 85/72* (2013.01)

(58) Field of Classification Search
CPC .......... B65D 23/04; B65D 1/04; B65D 85/72; B65D 1/0223; B65D 81/3211; A47J 43/27; C12G 3/04
USPC .............................. 220/501; 215/6
See application file for complete search history.

(56) References Cited

U.S. PATENT DOCUMENTS

| | | | | |
|---|---|---|---|---|
| 3,353,725 A * | 11/1967 | Caceres | ............... | G01F 11/261 239/377 |
| 4,893,732 A * | 1/1990 | Jennings | ............... | G01F 11/262 D9/741 |
| 5,556,011 A * | 9/1996 | Jennings | ............... | B65D 83/06 222/455 |
| 6,022,134 A * | 2/2000 | Andrews | .................. | B65D 1/04 215/DIG. 8 |
| 6,290,102 B1 * | 9/2001 | Jennings | ............... | G01F 11/262 222/158 |
| 8,641,891 B1 * | 2/2014 | Crowder | .................. | A45F 3/20 222/207 |

* cited by examiner

*Primary Examiner* — John K Fristoe, Jr.
*Assistant Examiner* — Jennifer Castriotta
(74) *Attorney, Agent, or Firm* — Martensen IP; Chad G. Clark

(57) ABSTRACT

The invention includes a container for storing liquids, the container including a blending chamber for holding a larger volume of liquid, and an opening that can be selectively sealed or unsealed. The container also includes a sampling chamber for holding a smaller volume of liquid, and another opening that can be selectively sealed or unsealed. Fluidically connecting the blending chamber and the sampling chamber is a siphon having an upper opening in the blending chamber and a lower opening in the sampling chamber. The siphon includes a siphoning level, which is a fluid height in the blending chamber at which liquid will siphon from the blending chamber to the sampling chamber. In some embodiments the siphon is located in the blending chamber.

8 Claims, 9 Drawing Sheets

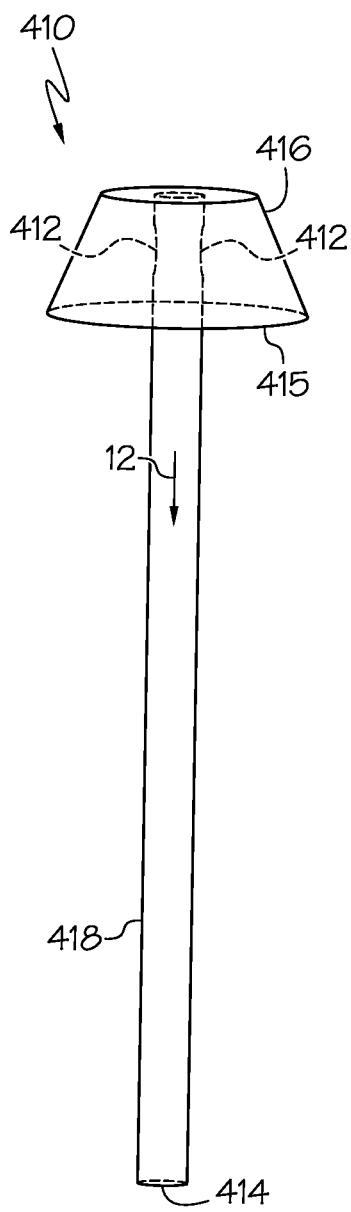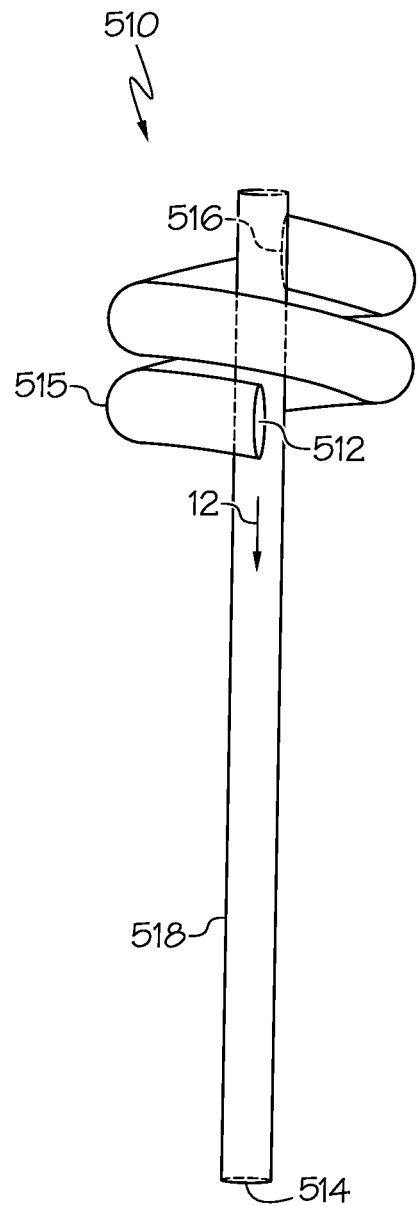
FIG. 4
FIG. 5

AUTOMATIC SELF-SAMPLING BOTTLE FOR SPIRITS

CROSS-REFERENCE TO RELATED APPLICATIONS

This application claims priority to U.S. Provisional Application No. 62/937,860, filed Nov. 20, 2019, the disclosure of which is hereby incorporated herein by reference in its entirety.

BACKGROUND

Field of the Invention

The present invention relates to devices and methods for storing, combining, and decanting spirits.

Relevant Background

People who enjoy drinking spirits, e.g., bourbon, whiskey, scotch, etc., often store their favorite alcoholic beverages an "infinity bottle." The infinity bottle is used to create a custom blend of spirits for home consumption. Typically, such custom blends are created by adding small amounts of different spirits to an infinity bottle until a set amount, usually 750 mL or 1 L, is reached. The various fractions can be added to the infinity bottle over a longer time period, which allows the blend to mature, or can be combined all at once. Once the infinity bottle is full, the blend is considered ready and can consumed at will. Typically, only a portion, e.g., 25 percent, is consumed at any one time, leaving the majority of the blend in the bottle, which can then be topped up with another spirit. Thus, the contents of a bottle holding such a blend can be "infinitely" served.

Infinity bottles are usually simply an empty (or at least partially empty) bottle that is set aside for the practice of adding additional spirits to create the blend. However, a partially empty bottle may not always be available, the bottle may not be shaped optimally for adding back different spirits, or the status of the bottle as an infinity bottle may not be apparent from the outside.

It is apparent that a need exists for a specialized container or decanter capable of automatically producing infinity bottle blended spirits. These and other deficiencies of the prior art are addressed by one or more embodiments of the disclosed invention. Additional advantages and novel features of this invention shall be set forth in part in the description that follows, and in part will become apparent to those skilled in the art upon examination of the following specification or may be learned by the practice of the invention. The advantages of the invention may be realized and attained by means of the instrumentalities, combinations, compositions, and methods particularly pointed out hereafter. The invention disclosed herein overcomes these drawbacks by disclosing novel bottle configurations that allow the automatic creation of infinity bottle blends.

Definitions

Before continuing with the background, a variety of definitions should be made, these definitions gaining further appreciation and scope in the detailed description and embodiments of the present invention. All terms defined herein are to be construed broadly, in accordance with their ordinary and customary meaning to a person having ordinary skill in the art.

Spirits means any distilled alcoholic beverage or liquor, including whisky, scotch, bourbon, vodka, rum, cognac, gin, etc.

Blend means a mixture of a plurality of different spirits.

This has served as a background for the present invention, including background technical invention needed to fully appreciate the present invention, which will now be summarized.

BRIEF DESCRIPTION OF THE DRAWINGS

Features and objects of the present invention and the manner of attaining them will become more apparent, and the invention itself will be best understood, by reference to the following description of one or more embodiments taken in conjunction with the accompanying drawings and figures imbedded in the text below and attached following this description.

FIG. 4 is an example alternative embodiment of the siphon portion of a device of the disclosed invention.

FIG. 5 is an example alternative embodiment of the siphon portion of a device of the disclosed invention.

Figure 1:
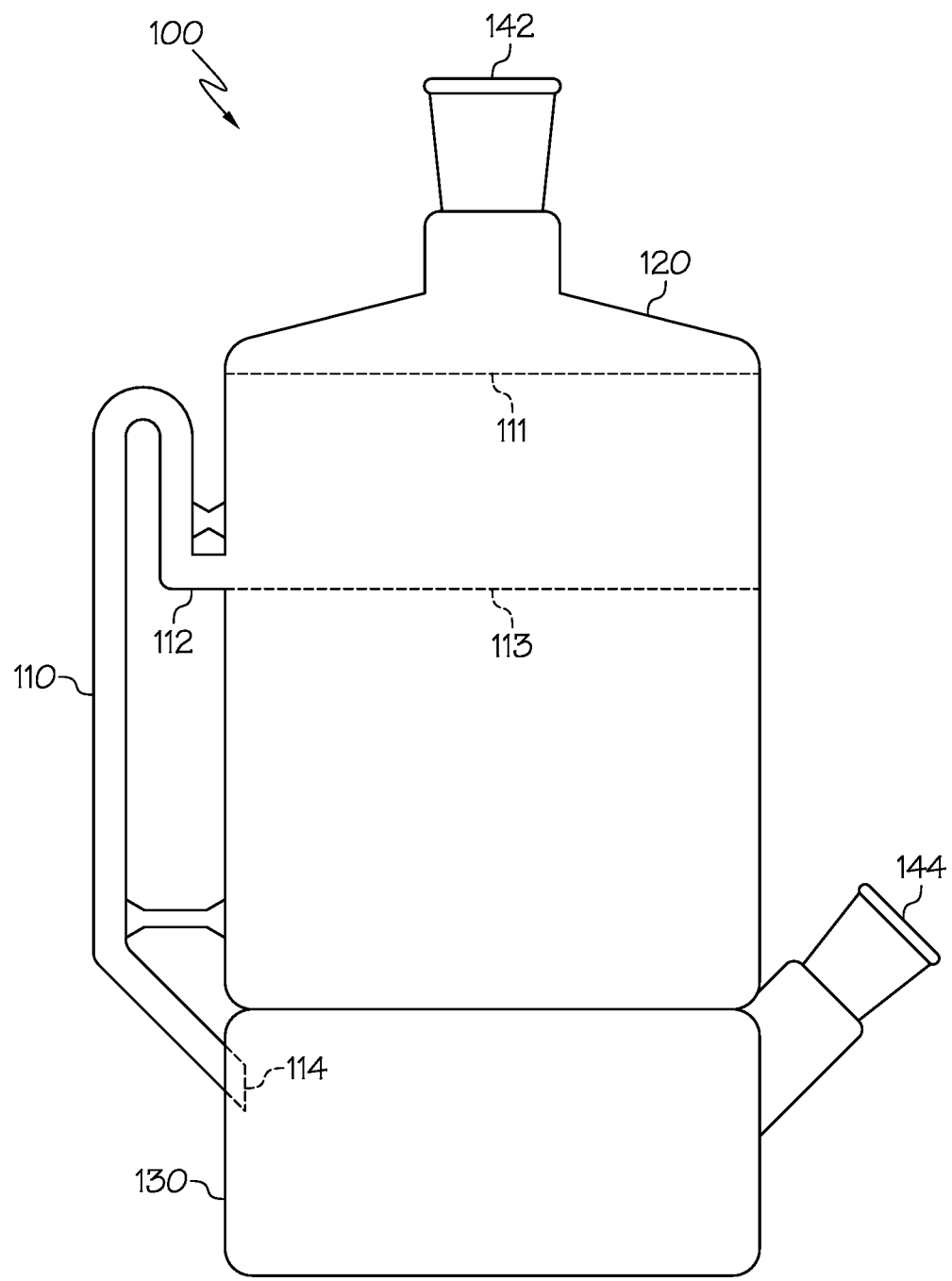
FIG. 1 is an example embodiment of at least a portion of the device of the disclosed invention featuring a side view of the device.

The Figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE INVENTION

An automatic infinity bottle for producing, storing and decanting custom blends of spirits is hereafter described. Embodiments of the disclosed invention comprise two containers connected by a siphon tube or other suitable mean. A first container including a selectively closeable opening for adding or moving liquids is configured for storing a certain volume of spirits. When the volume is exceeded, the excess spirit will move into the second container. Custom blends of sprits are thereby created in the second container and can be poured from a selectively closeable opening in the second container.

The disclosed invention will now be described in detail with reference to several embodiments thereof as illustrated in the accompanying Figures. In the following description, numerous specific details are set forth in order to provide a thorough understanding of embodiments of the present invention. It will be apparent, however, to one skilled in the art that embodiments may be practiced without some or all of these specific details. In other instances, well known process steps and/or structures have not been described in detail in order to not unnecessarily obscure the present invention. The features and advantages of embodiments may be better understood with reference to the drawings and discussions that follow. The disclosed invention may benefit from glasses, plastics, metals, alloys, chemicals, materials, and other features or designs, as commonly known to those skilled in the art of spirit storage, beverage containers, decanters, and product design. The disclosed invention applies to any type of device that stores spirits for consumption.

It should be apparent to those skilled in the art that the described embodiments of the present invention provided herein are illustrative only and not limiting, having been presented by way of example only. For example, the specific invention disclosed will not necessarily include all obvious features needed for operation, examples being materials specifications, glass, metal or plastic composition, sealing components, connecting hardware, and surface coatings, among other things. All features disclosed in this description may be replaced by alternative features serving the same or similar purpose, unless expressly stated otherwise. Therefore, numerous other embodiments of the modifications thereof are contemplated as falling within the scope of the present invention as defined herein and equivalents thereto. Hence, use of absolute and/or sequential terms, such as, for example, "always," "will," "will not," "shall," "shall not," "must," "must not," "first," "initially," "next," "subsequently," "before," "after," "lastly," and "finally," are not meant to limit the scope of the present invention as the embodiments disclosed herein are merely exemplary.

It will be also understood that when an element is referred to as being "on," "attached" to, "connected" to, "coupled" with, "contacting", "mounted", etc., another element, it can be directly on, attached to, connected to, coupled with or contacting the other element or intervening elements may also be present. In contrast, when an element is referred to as being, for example, "directly on," "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under," "below," "lower," "over," "upper" and the like, may be used herein for ease of description to describe one element or feature's relationship to another element(s) or feature(s) as illustrated in the figures. It will be understood that the spatially relative terms are intended to encompass different orientations of a device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of "over" and "under". The device may be otherwise oriented (rotated 90 degrees or at other orientations) and the spatially relative descriptors used herein interpreted accordingly. Similarly, the terms "upwardly," "downwardly," "vertical," "horizontal" and the like are used herein for the purpose of explanation only unless specifically indicated otherwise.

It is understood that many embodiments may require additional supporting technology or features, which are not captured in the description herein. Many of these auxiliary features of the device may, or may not, also require aspects of the present invention.

Automatic Infinity Bottles

With reference to FIG. 1, embodiments of the invention comprise a bottle 100 with two chambers connected by a siphon 110 to withdraw a fraction of liquid from a larger blending chamber 120 to a smaller sampling chamber 130. Each chamber has a selectively closeable opening, 142, 144, for the addition and removal of liquid. The siphon 110 is a section of hollow glass or metal tubing of uniform diameter of, e.g., 6 mm, and has an upper port 112 located in the blending chamber, and a lower port 114 located in the sampling chamber. Due to variations in surface tension for the different spirits to be stored in the bottle, the siphon may have different diameters, ranging from about 2 mm up to 8 mm. Liquid is added to the blending chamber 120 through the first opening 142 until the liquid fills into the upper port 112 and reaches a maximum volume, e.g., 1L, as defined by a siphoning level, denoted as the dotted line 111. For the depicted siphon, the siphoning level corresponds to the level at which fluid rises over the highest point of the bend, and is able to move down the tubing to the lower port. Once liquid is filled into the blending chamber past this siphoning level 111, the siphon 110 will activate and move liquid from the blending chamber 120 to the sampling chamber 130. Liquid will continue to siphon into the sampling chamber until the fluid level decreases to the port level 113. At this point, the siphon action is broken and the siphon ceases to move fluid. The siphon 110 can be mounted externally, such as in a Soxhlet Extractor, or mounted internally, see FIG. 3. The siphoned volume is determined by the difference in height between the siphoning level 111 and the port level 113. Once the siphoning is complete, liquid can be poured from the sampling chamber 130 through the second opening 144.

Figure 2:
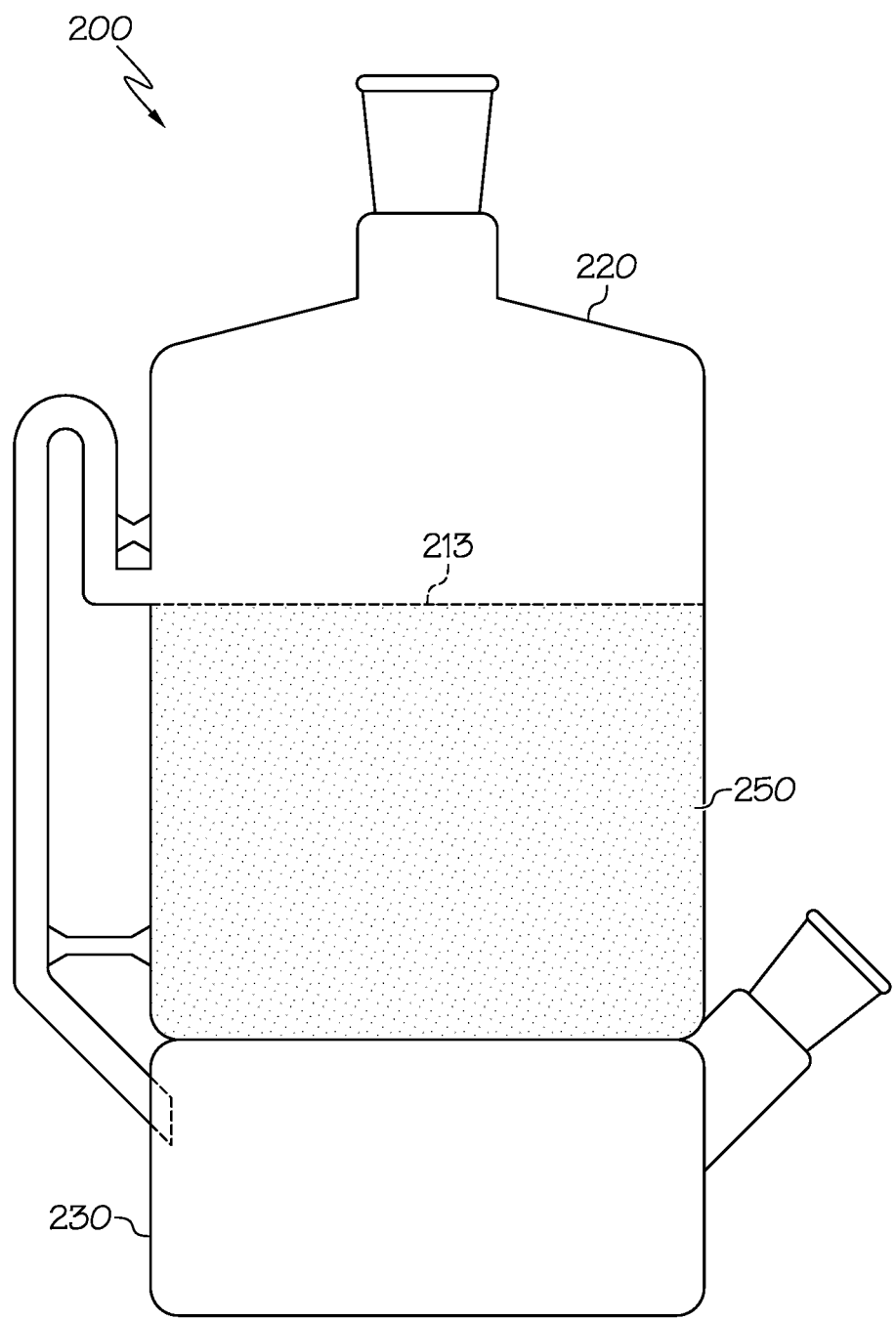
FIG. 2, FIG. 2A, FIG. 2B, and FIG. 2C depict the example embodiment of FIG. 1 in operation.
Figure 2A:
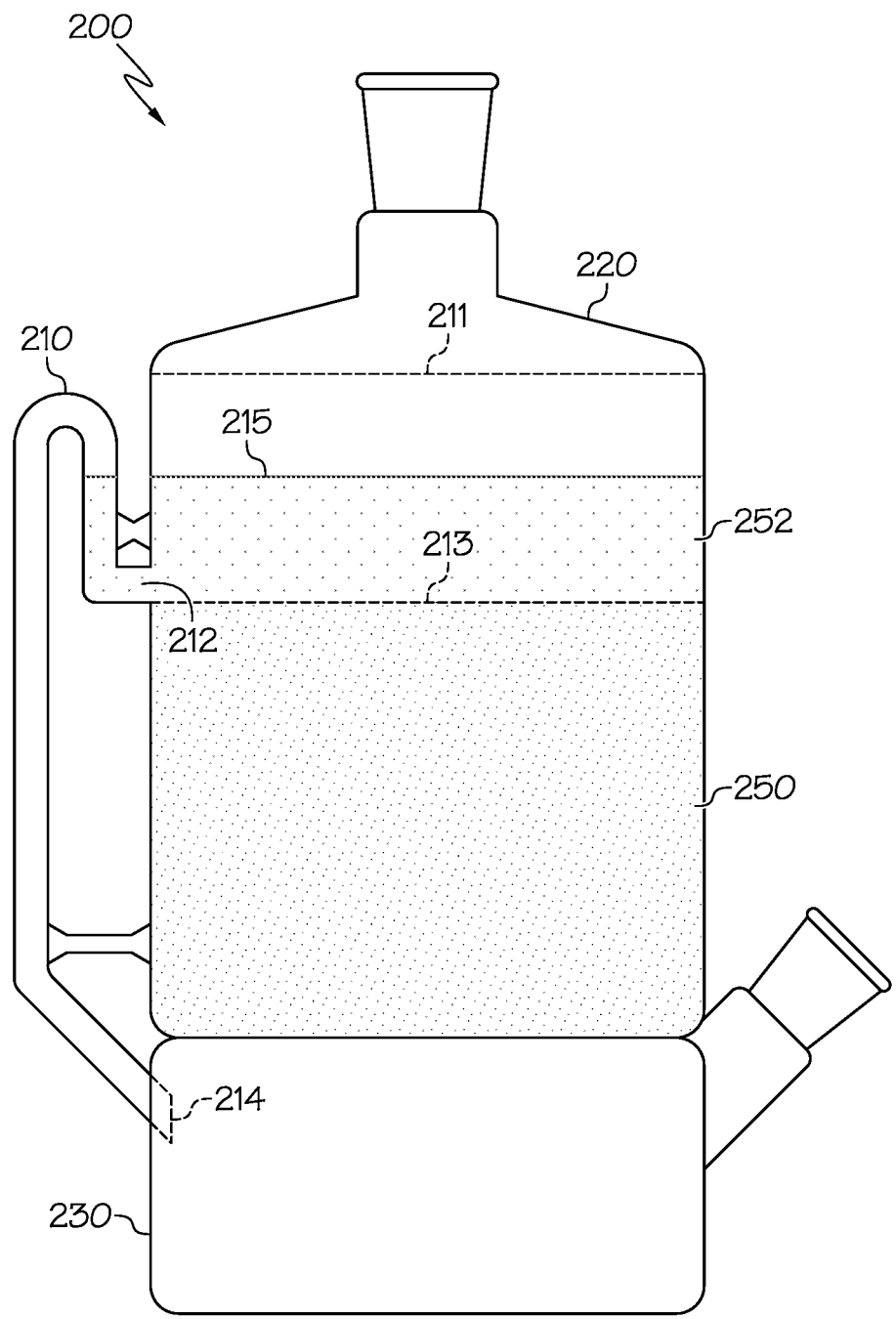
Figure 2B:
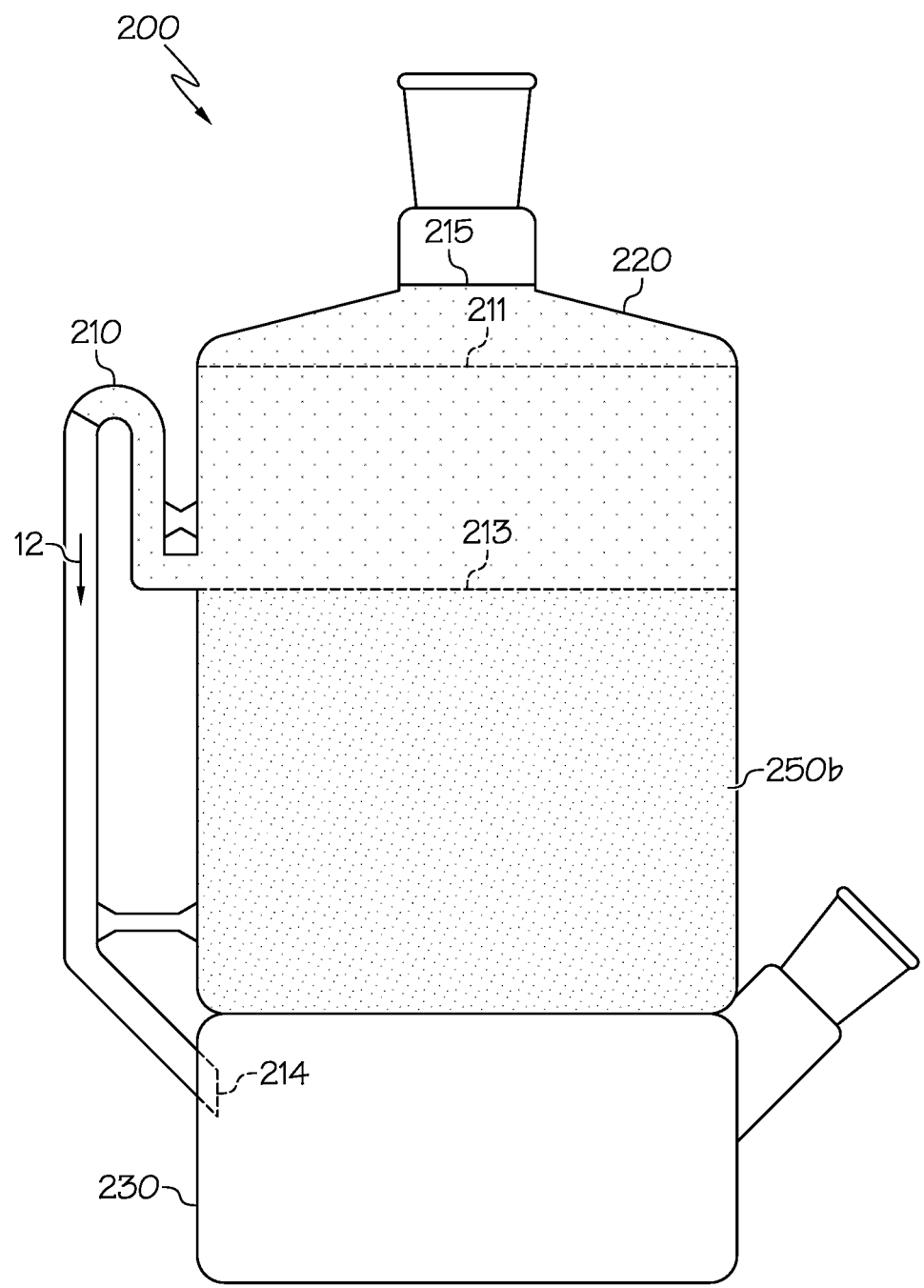
Figure 2C:
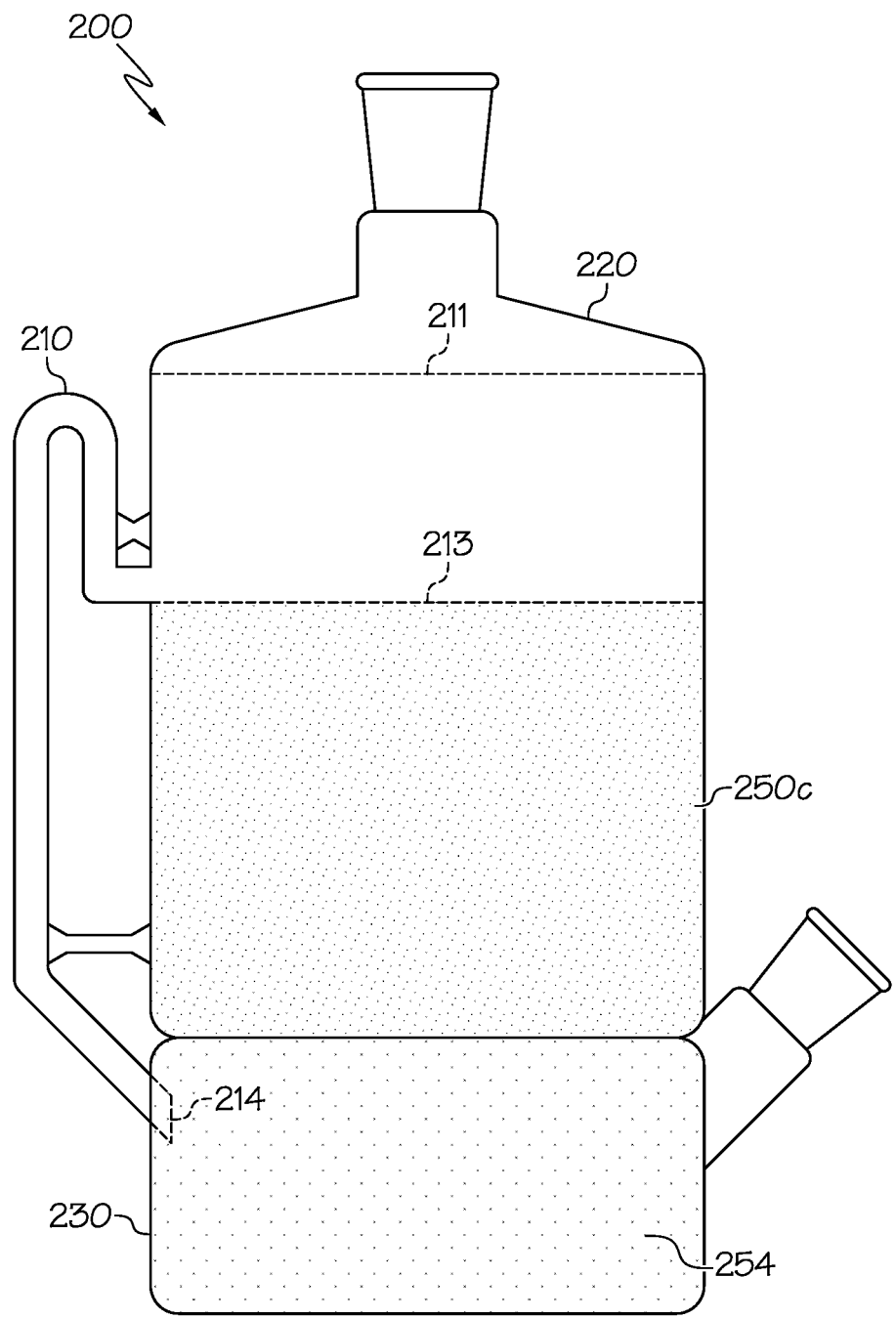

The operation of the automatic infinity bottle is illustrated through the following representative figures. With reference to FIG. 2, the bottle 200 has the blending chamber 220 filled with a volume of spirits 250, e.g., 750 mL, up to the port level 213. The sampling chamber 230 is empty. With reference to FIG. 2A, a volume of new spirits 252 has been added to the older spirits 250 in the blending chamber 220. The spirit blend volume is now at a fill height 215 above the port level 213, so that liquid moves into the siphon 210. However, the fill height 215 remains below the siphon level 211, so that the siphon 210 is not activated, and the sampling chamber 230 remains empty. With reference to FIG. 2B, additional spirits have been added to the blending chamber 220, so that the fill level 215 is now above the siphoning level 211. The siphon 210 has now been activated, and the spirit blend 250b moves into the siphon and in the direction of the arrow 12 toward the sampling chamber 230. The spirits 250b in the blending chamber 220 continue to move through the siphon 210 through the lower port 214 and into the sampling chamber 230. With reference to FIG. 2C, once the volume in the blending chamber reaches the port level 213, the siphon 210 deactivates, and the bottle has completed moving a portion of the spirits 254 into the sampling chamber 230. The volume moved to the sampling chamber is the same volume as held in the blending chamber between the port level 213 and the siphoning level 211, e.g., 250 mL.

Figure 3:
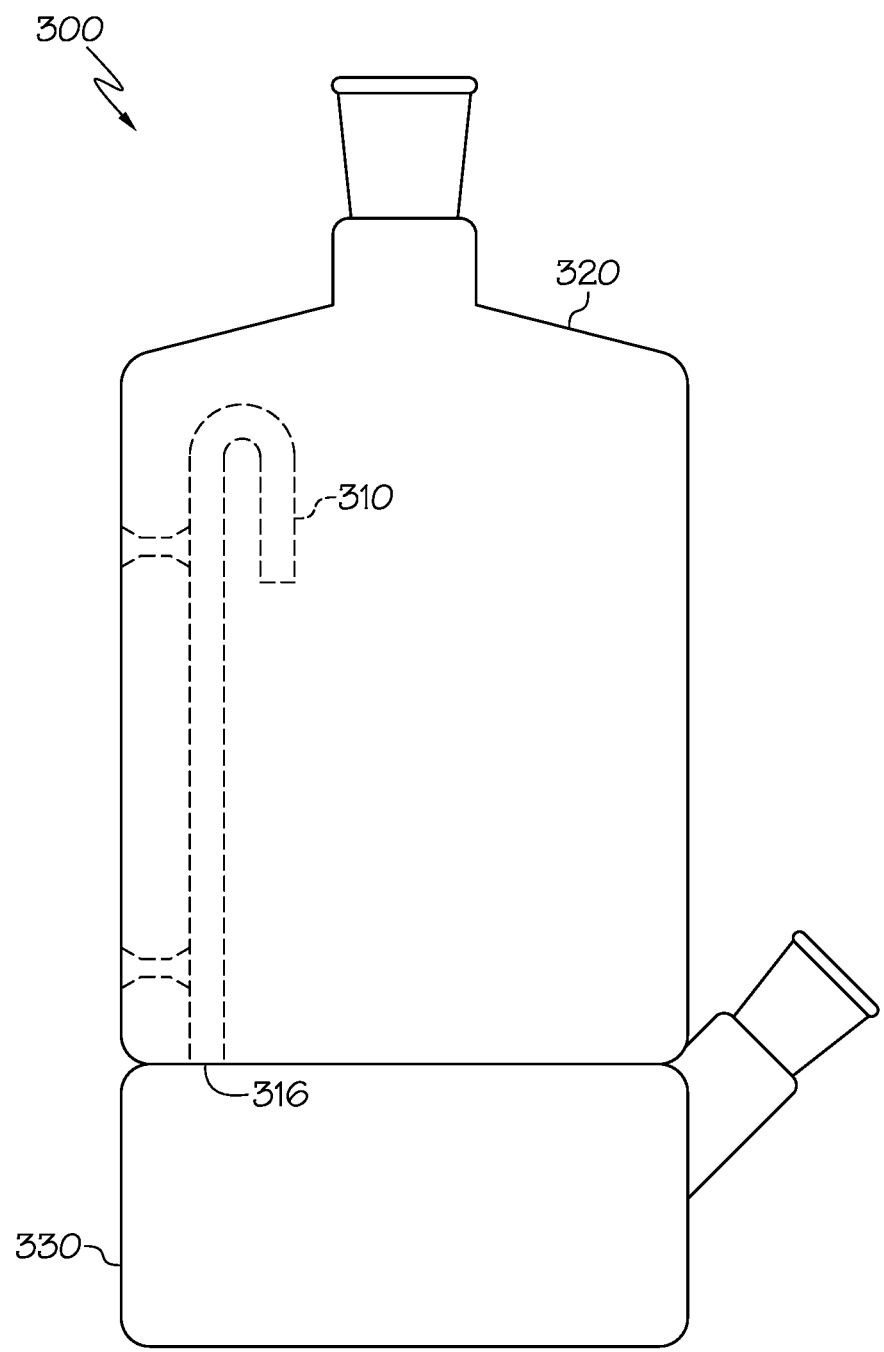
FIG. 3 is an example alternative embodiment of at least a portion of a device of the disclosed invention featuring a side view of the device.

With reference to FIG. 3, an alternate embodiment of the disclosed invention is depicted. In this embodiment, the siphon 310 is located entirely within the bottle 300. In this embodiment, the siphon 310 must pass from the blending chamber 320 to the sampling chamber 330 through an opening 316. This opening 316 is sealed around the siphon 310 so that liquid from the blending chamber cannot otherwise leak into the sampling chamber. Operation of this embodiment is substantially the same as described for the prior embodiment. This embodiment has the advantage of increased durability, since the siphon is less likely to be broken by contact with other objects.

With reference to FIGS. 4 and 5, alternate embodiments of the siphon are featured. FIG. 4 depicts a cap-type siphon 410. In place of the cane-type siphon of the previous figures, see element 210 of FIG. 2A, the cap-type siphon 410 comprises a central tube 418 that is topped by a cap structure 416 having a substantially circular lower rim 415. The central tube 418 includes one or more upper ports 412 (two are shown). In operation, this siphon will activate when fluid reaches the level of the upper ports 412, at which point fluid will enter the upper ports and flow down the central tube in the direction of the arrow 12, and out the lower port 414. The siphon will move liquid until the level is even with the lower rim of the cap 415.

FIG. 5 depicts a spiral-type siphon 510. The spiral-type siphon comprises a central tube 518 that has a section of tubing arranged in a spiral 515. The spiral tubing 515 includes a first port 512, and a second port 516. In operation, this siphon will activate when fluid reaches the level of the second port 516, at which point fluid will enter the second port 516 and flow down the central tube in the direction of the arrow 12, and out the lower port 514. The siphon will move liquid until the level is even with the first port 512.

Figure 6:
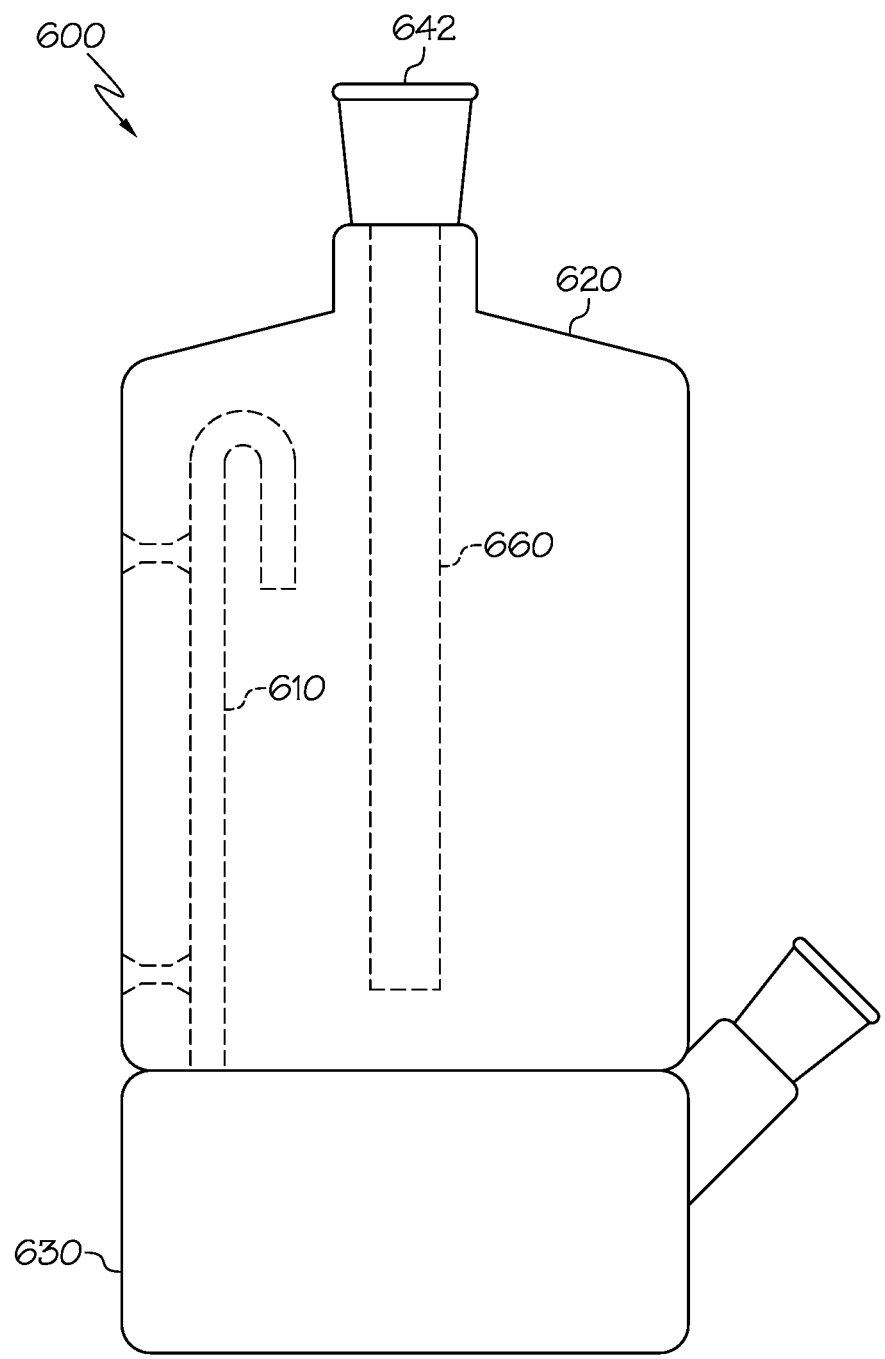
FIG. 6 is an example alternative embodiment of at least a portion of a device of the disclosed invention featuring a side view of the device.

With reference to FIG. 6, another alternative embodiment of the bottle 600 is depicted. This embodiment includes a dip tube 660 that is located in the blending chamber 620, and is connected to the upper opening 642. The dip tube 660 is a section of hollow tubing extends from the upper opening 642 towards the bottom of the blending chamber. In this embodiment, to add or remove liquid from the blending chamber 620 through the upper opening 642, the liquid must go through the dip tube 660. The dip tube serves as a "no cheating" feature, since it makes removing spirits from the blending chamber out of the upper opening very difficult, and thus makes it difficult to duplicate a particular spirit blend.

Figure 7:
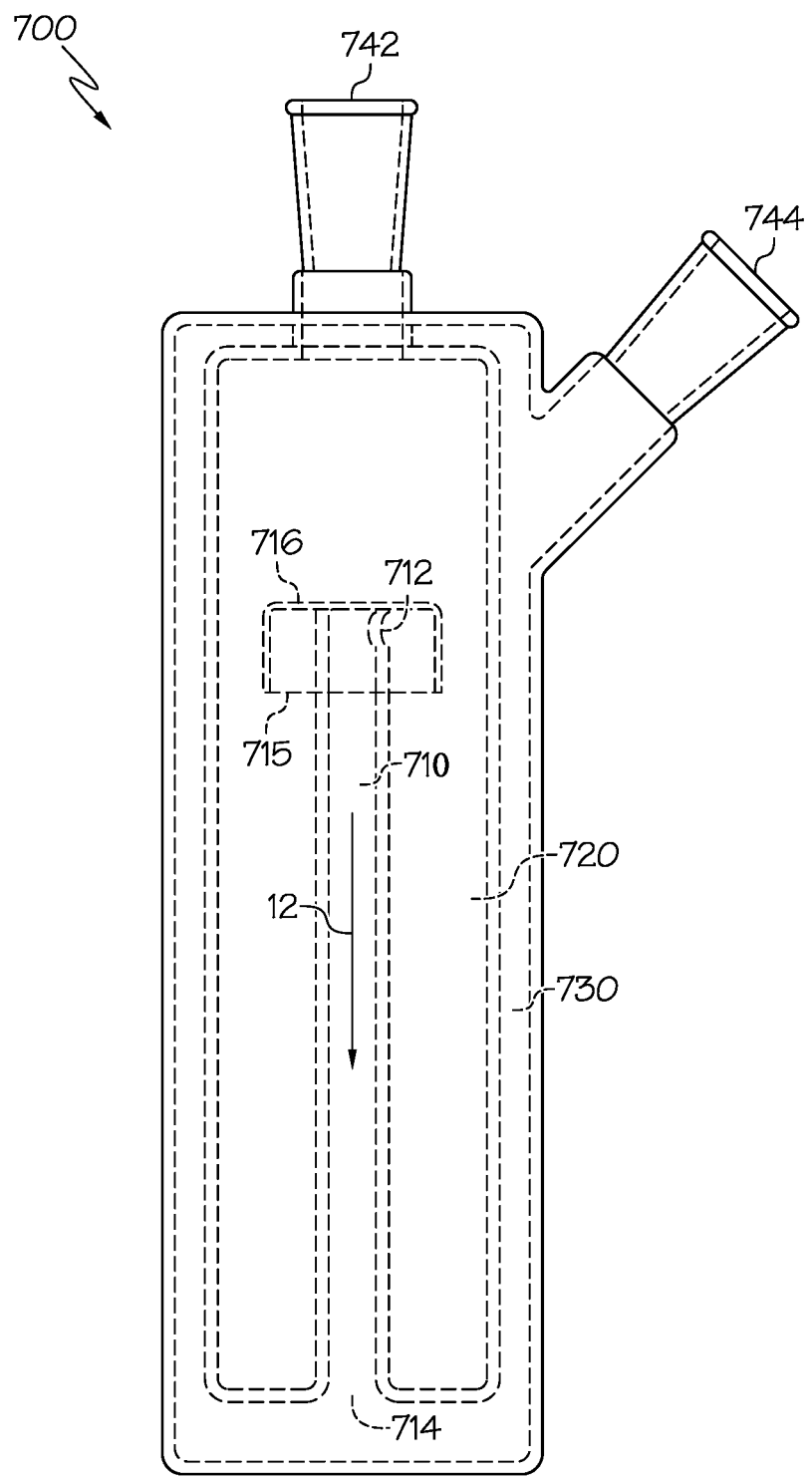
FIG. 7 is an example alternative embodiment of at least a portion of a device of the disclosed invention featuring a side view of the device.

With reference to FIG. 7, some embodiments comprise a bottle 700 with an alternative configuration of the two chambers. In these embodiments, the blending chamber 720 is located in the center portion of the bottle 700, and the sampling chamber 730 is located around the outside of the blending chamber. The two chambers are connected by a siphon 710 to withdraw a fraction of liquid from the blending chamber 720 to the sampling chamber 730. As with the other embodiments, each chamber has a selectively closeable opening, 742, 744, for the addition and removal of liquid. The siphon 710 is a section of hollow glass or metal tubing of uniform diameter of, e.g., 6 mm, and has an upper port 712 located in the blending chamber, and a lower port 714 opening into the sampling chamber. A cap-type siphon similar to that depicted in FIG. 4 is shown, but any suitable configuration may be used. Liquid is added to the blending chamber 720 through the first opening 742 until the liquid begins to fill into the upper port 712 activating the siphon 710. The activated siphon moves liquid from the blending chamber 720 in the direction of the arrow 12 to the sampling chamber 730 until the fluid level decreases to the bottom 715 of the cap structure 716. At this point, the siphon action is broken and the siphon ceases to move fluid. The siphoned volume is determined by the difference in height between the bottom of the upper port 712 and the bottom of the cap 715. Once the siphoning is complete, liquid can be poured from the sampling chamber 730 through the second opening 744.

The automatic infinity bottles as disclosed herein may be made of any suitable material, including glass, borosilicate, metal, polymer, or wood, though glass or borosilicate are preferred. The siphon may be the same material as the bottle, or may be a different material. The openings may have any suitable configuration known in the art, with closure mechanisms configured to create an airtight seal that can be opened and closed multiple times. For example, some embodiments may have a smooth walled opening with a glass, cork, rubber, or plastic stopper. Other embodiments may include threaded openings with a screw-type plug or cap made from plastic, glass or metal. Other examples include a stopper secured with a wire latch, etc.

This has been a description of the disclosed invention along with a preferred method of practicing the invention, however the invention itself should only be defined by the appended claims.

What is claimed is:

1. A container for storing liquids, comprising:
 a blending chamber configured to store a first volume of liquid, the blending chamber having a first opening that is selectively closeable;
 a sampling chamber configured to store a second volume of liquid, wherein the first volume is larger than the second volume, the sampling chamber having a second opening that is selectively closeable;
 a siphon configured to fluidically connect the blending chamber to the sampling chamber, the siphon comprising an upper port opening to the blending chamber, a lower port opening to the sampling chamber, and a siphoning level, wherein the siphoning level corresponds to a fluid height above which liquid is moved by siphon action through the siphon from the blending chamber into the sampling chamber; and
 wherein the container is configured to automatically move a mixing volume of liquid to the sampling chamber when the blending chamber is filled above the siphoning level, wherein the mixing volume is partially defined by the siphoning level and the upper port.

2. The container of claim 1, wherein the siphon has one of the following configurations: mounted on the inside of the blending chamber, or mounted on the outside of the container.

3. The container of claim 1, wherein the liquid is a spirit.

4. The container of claim 1, wherein the container is made of glass.

5. The container of claim 1, wherein the siphon is made of one of the following: glass tubing, or metal tubing.

6. The container of claim 1, wherein the siphon may be configured to have a diameter as small as 2 millimeters (mm) and as large as 8 mm.

7. The container of claim 1, wherein the blending chamber has a first blending volume of 750 milliliters (mL), wherein the first blending volume is partially defined by the upper port, wherein the blending chamber has a second blending volume of 1 liter, and wherein the second blending volume is partially defined by the siphoning level.

8. The container of claim 1, wherein the mixing volume is 250 mL.

\* \* \* \* \*